US009858496B2

(12) United States Patent
Sun et al.

(10) Patent No.: US 9,858,496 B2
(45) Date of Patent: Jan. 2, 2018

(54) OBJECT DETECTION AND CLASSIFICATION IN IMAGES

(71) Applicant: Microsoft Technology Licensing, LLC, Redmond, WA (US)

(72) Inventors: Jian Sun, Beijing (CN); Ross Girshick, Seattle, WA (US); Shaoqing Ren, Beijing (CN); Kaiming He, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/001,417

(22) Filed: Jan. 20, 2016

(65) Prior Publication Data

US 2017/0206431 A1    Jul. 20, 2017

(51) Int. Cl.
  *G06K 9/62* (2006.01)
  *G06K 9/46* (2006.01)
  *G06N 3/08* (2006.01)
  *G06F 17/30* (2006.01)

(52) U.S. Cl.
  CPC ..... *G06K 9/4671* (2013.01); *G06F 17/30864* (2013.01); *G06K 9/6267* (2013.01); *G06N 3/084* (2013.01)

(58) Field of Classification Search
  None
  See application file for complete search history.

(56) References Cited

U.S. PATENT DOCUMENTS

| 6,038,337 | A | 3/2000 | Lawrence et al. | |
|---|---|---|---|---|
| 7,890,443 | B2 * | 2/2011 | Zhang | G06K 9/00288 706/45 |
| 8,010,471 | B2 * | 8/2011 | Zhang | G06K 9/00288 706/12 |
| 8,233,711 | B2 | 7/2012 | Wang et al. | |
| 8,374,442 | B2 | 2/2013 | Yu et al. | |

(Continued)

OTHER PUBLICATIONS

Girshick, Ross, et al. "Rich feature hierarchies for accurate object detection and semantic segmentation." Proceedings of the IEEE conference on computer vision and pattern recognition. 2014.*

(Continued)

*Primary Examiner* — Andrae S Allison
(74) *Attorney, Agent, or Firm* — Schwegman Lundberg & Woessner, P.A.

(57) ABSTRACT

Systems, methods, and computer-readable media for providing fast and accurate object detection and classification in images are described herein. In some examples, a computing device can receive an input image. The computing device can process the image, and generate a convolutional feature map. In some configurations, the convolutional feature map can be processed through a Region Proposal Network (RPN) to generate proposals for candidate objects in the image. In various examples, the computing device can process the convolutional feature map with the proposals through a Fast Region-Based Convolutional Neural Network (FRCN) proposal classifier to determine a class of each object in the image and a confidence score associated therewith. The computing device can then provide a requestor with an output including the object classification and/or confidence score.

17 Claims, 7 Drawing Sheets

(56) References Cited

U.S. PATENT DOCUMENTS

| | | | |
|---|---|---|---|
| 8,442,321 | B1 | 5/2013 | Chang et al. |
| 8,447,119 | B2 | 5/2013 | Yu |
| 8,594,385 | B2 | 11/2013 | Marchesotti et al. |
| 8,761,446 | B1 | 6/2014 | Frome et al. |
| 8,761,510 | B2 | 6/2014 | Russakovsky et al. |
| 9,147,255 | B1* | 9/2015 | Zhang ............... G06T 7/0079 |
| 9,418,319 | B2* | 8/2016 | Shen ............... G06K 9/4628 |
| 2004/0131233 | A1 | 7/2004 | Comaniciu et al. |
| 2008/0260239 | A1 | 10/2008 | Han et al. |
| 2011/0311129 | A1* | 12/2011 | Milanfar ........... G06K 9/00335 382/154 |
| 2012/0207346 | A1* | 8/2012 | Kohli ............... G06K 9/6211 382/103 |
| 2013/0129143 | A1 | 5/2013 | Chen et al. |
| 2014/0270551 | A1* | 9/2014 | Baranowski ........ G06K 9/6285 382/226 |
| 2015/0036920 | A1 | 2/2015 | Wu et al. |

OTHER PUBLICATIONS

Ren, Shaoqing, et al. "Faster r-cnn: Towards real-time object detection with region proposal networks." Advances in neural information processing systems. 2015.*

Simonya et al, Very Deep Convolutional Networks for Large-Scale Image Recognition, Published as a conference paper at ICLR 2015.*

Krizhevsky, Alex, Ilya Sutskever, and Geoffrey E. Hinton. "Imagenet classification with deep convolutional neural networks." Advances in neural information processing systems. 2012.*

Sermanet, Pierre, et al. "Overfeat: Integrated recognition, localization and detection using convolutional networks." arXiv preprint arXiv:1312.6229 (2013).*

Chavali, et al., "Object Proposal Evaluation Protocol is 'Gameable'", In Journal of Computing Research Repository, May 2015, 15 pages.

Dai, et al., "Convolutional Feature Masking for Joint Object and Stuff Segmentation", In Proceedings of IEEE Conference on Computer Vision and Pattern Recognition, Jun. 8, 2015, pp. 3992-4000.

Erhan, et al., "Scalable Object Detection using Deep Neural Networks", In Proceedings of IEEE Conference on Computer Vision and Pattern Recognition, Jun. 24, 2014, 8 pages.

Everingham, et al., "The Pascal Visual Object Classes (VOC) Challenge", In Proceedings of PASCAL Challenge Workshop, Sep. 1, 2015, pp. 1-34.

Girshick, et al., "Deformable Part Models are Convolutional Neural Networks", In Proceedings of Conference on Computer Vision and Pattern Recognition, Jun. 8, 2015, 10 pages.

Girshick, Ross, "Fast R-CNN", In Journal of Computing Research Repository, Apr. 2015, pp. 1-9.

Girshick, et al., "Region-based Convolutional Networks for Accurate Object Detection and Segmentation", In Journal of IEEE Transactions on Pattern Analysis and Machine Intelligence, May 25, 2015, pp. 1-16.

Girshick, et al., "Rich Feature Hierarchies for Accurate Object Detection and Semantic Segmentation", In Proceedings of IEEE Conference on Computer Vision and Pattern Recognition, Jun. 24, 2014, pp. 580-587.

He, et al., "Spatial Pyramid Pooling in Deep Convolutional Networks for Visual Recognition", In Proceedings of European Conference on Computer Vision, Sep. 6, 2014, pp. 1-16.

He, et al., "SuperCNN A Superpixelwise Convolutional Neural Network for Salient Object Detection", In International Journal of Computer Vision, Apr. 8, 2015, 15 pages.

Hoffman, et al., "LSDA Large Scale Detection through Adaptation", In Journal of Advances in Neural Information Processing Systems, Jul. 2014, pp. 1-9.

Hosang, et al., "How good are Detection Proposals, Really", In Proceedings of British Machine Vision Conference, Sep. 1, 2014, 25 pages.

Hosang, et al., "What makes for Effective Detection Proposals", In Journal of Computing Research Repository, Feb. 2015, pp. 1-16.

Jia, et al., "Caffe Convolutional Architecture for Fast Feature Embedding", In Proceedings of ACM International Conference on Multimedia, Nov. 3, 2014, pp. 675-678.

Krizhevsky, et al., "ImageNet Classification with Deep Convolutional Neural Networks", In Proceedings of Advances in Neural Information Processing Systems, Dec. 8, 2012, pp. 1-9.

Lecun, et al., "Backpropagation applied to Handwritten Zip Code Recognition", In Journal of Neural Computation, vol. 1, Issue 4, Dec. 1989, pp. 541-551.

Li, et al., "A Convolutional Neural Network Cascade for Face Detection", In Proceedings of IEEE Conference on Computer Vision and Pattern Recognition, Jun. 8, 2015, 10 pages.

Long, et al., "Fully Convolutional Networks for Semantic Segmentation", In Proceedings of 28th IEEE Conference on Computer Vision and Pattern Recognition, Jun. 7, 2015, 10 pages.

McCann, et al., "Object Detection using Convolutional Neural Networks", Published on Jan. 23, 2014, Available at <<http://cs229.stanford.edu/proj2013/ReesmanMcCannVehicle20Detection.pdf>>, 5 pages.

Nair, et al., "Rectified Linear Units Improve Restricted Boltzmann Machines", In Proceedings of the 27th International Conference on Machine Learning, Jun. 21, 2010, 8 pages.

Ren, et al., "Object Detection Networks on Convolutional Feature Maps", In Proceedings of the Computing Research Repository, Apr. 2015, pp. 1-9.

Russakovsky, et al., "ImageNet Large Scale Visual Recognition Challenge", In Proceedings of the Computing Research Repository, Sep. 2014, pp. 1-43.

Sakai, et al., "Real time Pedestrian Detection Using LIDAR and Convolutional Neural Networks", In Proceedings of 13th World Congress on ITS, Oct. 8, 2006, pp. 45-49.

Sermanet, et al., "OverFeat Integrated Recognition, Localization and Detection using Convolutional Networks", In Proceedings of International Conference on Learning Representations, Apr. 14, 2015, pp. 1-16.

Simonyan, et al., "Very Deep Convolutional Networks for Large Scale Image Recognition", In Proceedings of International Conference on Learning Representations, May 7, 2015, pp. 1-14.

Szegedy, et al., "Scalable, High-Quality Object Detection", In Proceedings of the Computing Research Repository, Dec. 2014, 9 pages.

Szegedy, et al., "Deep Neural Networks for Object Detection", In Proceedings of Advances in Neural Information Processing Systems 26, Dec. 5, 2013, pp. 1-9.

Uijlings, et al., "Selective Search for Object Recognition", In Proceedings of in International Journal of Computer, vol. 104, No. 2, Sep. 2013, 18 pages.

U.S. Application No. PCT/CN2014/088165, He, et al., "A Realtime and Accurate System for Generic Object Detection in Images", Filed Date Oct. 9, 2014.

Xu, et al., "Robust Seed Localization and Growing with Deep Convolutional Features for Scene Text Detection", In Proceedings of 5th ACM on International Conference on Multimedia Retrieval, Jun. 23, 2015, pp. 387-394.

Zeiler, et al., "Visualizing and Understanding Convolutional Neural Networks", In Proceedings of the 13th European Conference on Computer Vision, vol. 1, Sep. 6, 2014, pp. 818-833.

Zitnick, et al., "Edge Boxes Locating Object Proposals from Edges", In Proceedings of 13th European Conference on Computer Vision, vol. 5, Sep. 6, 2014, pp. 1-15.

Zou, et al., "Generic Object Detection with Dense Neural Patterns and Regionlets", In Technical Report, Nov. 30, 2013, 10 pages.

Boureau, et al., "Ask the locals multi-way local pooling for image recognition", In IEEE International Conference on Computer Vision (ICCV), Nov. 6, 2011, 8 pages.

Chang, et al., "Libsvm: A Library for Support Vector Machines", In ACM Transactions on Intelligent Systems and Technology, May 2011, 39 pages.

Chatfield, et al., "The Devil is in the Details: An Evaluation of Recent Feature Encoding Methods", In British Machine Vision Conference, Aug. 29, 2011, 12 pages.

(56) References Cited

OTHER PUBLICATIONS

Cheng, et al., "BING: Binarized normed gradients for objectness estimation at 300fps", In IEEE Computer Society Conference on Computer Vision and Pattern Recognition, Jun. 24, 2014, 8 pages.
Coates, et al., "The Importance of Encoding Versus Training With Sparse Coding and Vector Quantization", In Proceedings of the 28th International Conference on Machine Learning, Jun. 28, 2011, 8 pages.
Dalal, et al., "Histograms of oriented gradients for human detection", In Proceedings of the IEEE Computer Society Conference on Computer Vision and Pattern Recognition, Jun. 25, 2005, 8 pages.
Deng, et al., "Imagenet: A Large-Scale Hierarchical Image Database", In IEEE Conference on Computer Vision and Pattern Recognition, Jun. 25, 2009, 8 pages.
Denton, et al., "Exploiting Linear Structure within Convolutional Networks for Efficient Evaluation", In Proceeding of the Computing Research Repository, Apr. 2014, 11 pages.
Donahue, et al., "Decaf: A deep convolutional activation feature for generic visual recognition", In arXiv preprint arXiv:1310.1531, Oct. 2013, 10 pages.
Fei, et al., "Learning generative visual models from few training examples: An Incremental Bayesian Approach Tested on 101 Object Categories", In Journal Computer Vision and Image Understanding, vol. 106, Issue 1, Apr. 2007, 9 pages.
Felzenszwalb, et al., "Object Detection with Discriminatively Trained Partbased Models", In IEEE Transactions on Pattern Analysis and Machine Intelligence, vol. 32, Issue 9 , Sep. 2010, 20 pages.
Gemert, et al., "Kernel Codebooks for Scene Categorization", In Proceeding of 10th European Conference on Computer Vision, Oct. 12, 2008, 15 pages.
Gong, et al., "Multi-scale orderless pooling of deep convolutional activation features", In Proceedings of arXiv:1403.1840, Mar. 2014, 16 pages.
Grauman, et al., "The Pyramid Match Kernel: Discriminative Classification with Sets of Image Features", In Tenth IEEE International Conference on Computer Vision, Oct. 17, 2005, 8 pages.
Han, et al., "Hierarchical spatial pyramid max pooling based on SIFT features and sparse coding for image classification", In Proceeding of Computer Vision, vol. 7, Issue 2, Apr. 2013, 7 pages.
Howard, Andrew G., "Some Improvements on Deep Convolutional Neural Network Based Image Classification", In Proceeding of the Computing Research Repository, Dec. 2013, 6 pages.
ISR/WO dtd Jun. 26, 2016 for Internation Application No. PCT/CN2014/088165, 13 pages, MS Ref # 355570.01.
Lazebnik, et al., "Beyond Bags of Features: Spatial Pyramid Matching for Recognizing Natural Scene Categories", In Proceedings of the IEEE Computer Society Conference on Computer Vision and Pattern Recognition—vol. 2, Jun. 17, 2006, 8 pages.
Li, et al., "Recognition of Deformable Object Category and Pose", In Proceedings of the IEEE International Conference on Robotics and Automation, Jun. 2014, 7 pages.
Lowe, David G., "Distinctive Image Features from Scale-Invariant Keypoints", In Journal International Journal of Computer Vision, vol. 60, Issue 2, Jan. 5, 2004, 28 pages.
Mathieu, et al., "Fast training of convolutional networks through ffts", In Proceeding of arXiv:1312.5851, Dec. 2013, 9 pages.
Oquab, et al., "Learning and Transferring Mid-Level Image Representations using Convolutional Neural Networks", In Proceedings of the Computer Society Conference on Computer Vision and Pattern Recognition, Jun. 24, 2014, 8 pages.
Perronnin, et al., "Improving the Fisher Kernel for Large-Scale Image Classification", In Proceedings of the 11th European conference on Computer vision: Part IV, Sep. 5, 2010, 14 pages.
Razavian, et al., "CNN features off-the-shelf: An astounding baseline for recogniton", In Proceedings of the Computer Society Conference on Computer Vision and Pattern Recognition, Mar. 2014, 8 pages.
Sande, et al., "Fisher and VLAD with FLAIR", In IEEE Conference on Computer Vision and Pattern Recognition, Jun. 23, 2013, 8 pages.
Sande, et al., "Segmentation as Selective Search for Object Recognition", In IEEE International Conference on Computer Vision, Nov. 6, 2011, 8 pages.
Sivic, et al., "Video google: a text retrieval approach to object matching in videos", In Proceedings of the Ninth IEEE International Conference on Computer Vision, Oct. 13, 2003, 8 pages.
Taigman, et al., "Deepface:Closing the gap to human-level performance in face verification", In Proceedings of the IEEE Conference on Computer Vision and Pattern Recognition, Mar. 11, 2014, 8 pages.
Vijayanarasimhan, et al., "Large-Scale Live Active Learning Training Object Detectors with Crawled Data and Crowds", In Proceedings of the IEEE Conference on Computer Vision and Pattern Recognition, Jun. 20, 2011, 8 pages.
Wang, et al., "Regionlets for generic object detection", In IEEE International Conference on Computer Vision, Dec. 2013, 8 pages.
Yang, et al., "Supervised translation-invariant sparse coding", In IEEE Conference on Computer Vision and Pattern Recognition (CVPR), Jun. 13, 2010, 8 pages.
Zhang, et al., "Panda: Pose aligned networks for deep attribute modeling", In Conference on Computer Vision and Pattern Recognition, Jun. 24, 2014, 8 pages.

* cited by examiner

OBJECT DETECTION AND CLASSIFICATION IN IMAGES

BACKGROUND

As search engine capabilities increase, so does the demand for faster and more capable searches by users. Image searches have become increasingly more popular as both camera technology and search capabilities improve. Conventionally, object detection in image searches is done using a convolutional neural network. In some models, the convolutional neural network may be paired with selective search to generate proposal images, in order to increase the accuracy of the object detection. However, the current methods of object detection are slow and onerous.

SUMMARY

This disclosure describes systems, methods, and computer-readable media for providing faster and more accurate object detection and classification in images. In some configurations, a computing device can receive an image. The computing device can process the image, and generate a convolutional feature map. In some configurations, the convolutional feature map can be processed through a Region Proposal Network (RPN) to generate the proposal candidate locations of objects in the image.

The computing device can then process the convolutional feature map with proposal candidate locations through a proposal classifier, and determine what objects are in the image. Techniques and technologies described herein can apply a Fast Region-Based Convolutional Neural Network (FRCN) to determine a classification (e.g., a type, a class, a group, a category, etc.) of each object, and a confidence score associated with the classification (e.g., how accurate the system believes the classification to be). An output including the object classification and/or confidence score can then be provided to a requestor.

Example techniques described herein can apply machine learning to train a model with training images to provide fast and accurate object detection and classification in images. In some configurations, a multi-step machine learning process can be implemented to train the object detection and classification system. In some configurations, a single-step machine learning process can be implemented to train the object detection and classification system.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to systems, methods, computer-readable instructions, modules, algorithms, hardware logic and/or operations as permitted by the context described above and throughout the document. Additionally, the terms "class," "category," "type," and "group" of objects in an image can be considered synonymous terms with regard to the classification of an object. Furthermore, the claimed subject matter is not limited to implementations that solve any or all disadvantages noted in any part of this disclosure.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

The technologies described herein provide techniques and constructs to improve object detection and classification in images. In some examples, a computing system can receive an image. The computing system can sequentially process the image through multiple layers of a Deep Convolutional Neural Network (Deep CNN), and generate a convolutional feature map.

In various examples, the computing system can input the convolutional feature map into an RPN. In such examples, the RPN can evaluate the convolutional feature map and generate proposals (e.g., object candidate locations) on the convolutional feature map. In some examples, the proposals can be in the form of bounding boxes. For instance, the RPN can generate rectangular bounding boxes around potential objects (e.g., substance in the image that is more likely than not to be an object) on the convolutional feature map.

In various examples, the computing system can input the convolutional feature map with proposals into an FRCN to determine a classification (e.g., a type, a class, a group, a category, etc.) of each potential object. In some examples, the FRCN may determine that the object class matches one of a pre-determined number of object classes, and may label the object accordingly. Conversely, the FRCN may determine that the object does not match one of the pre-determined number of object classes, and it may label the object as background.

In some examples, the FRCN can evaluate the class labels assigned to each of the objects in the image, and assign a confidence score to the classification (e.g., how accurate the system believes the classification to be). An output including the object classification and/or confidence score can then be provided to a requestor.

Additionally, the computing system can apply machine learning to train a model with training images to provide accurate object detection and classification. In various examples, the machine learning training process can include multiple steps of training. In some examples, the machine learning training process can include a single training step.
Illustrative Environment The environment described below constitutes but one example and is not intended to limit the claims to any one particular operating environment. Other environments can be used without departing from the spirit and scope of the claimed subject matter.

Figure 1:
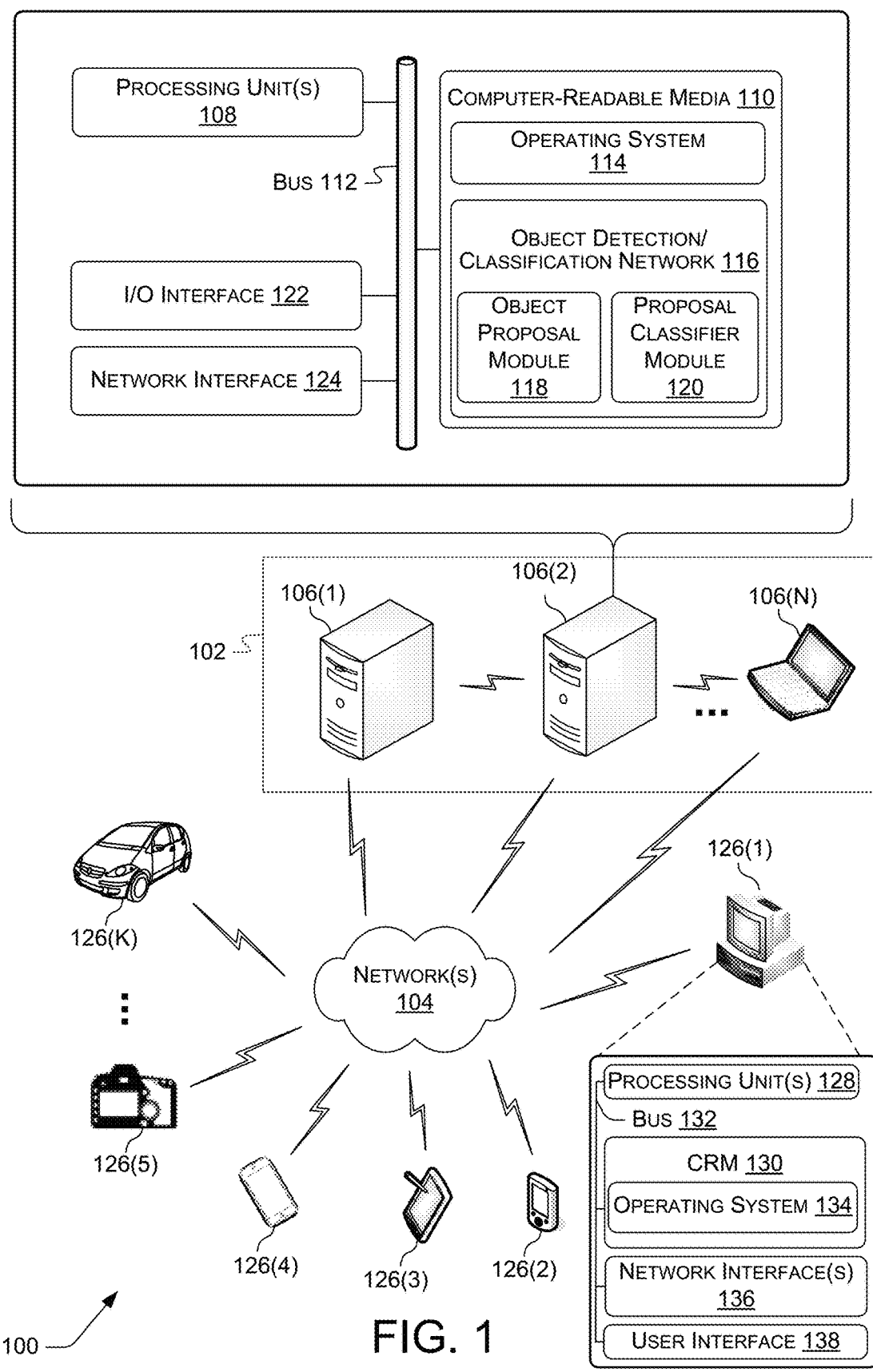
FIG. 1 is a block diagram depicting an example environment in which examples of an object detection and classification network can operate.

FIG. 1 shows an example environment 100 in which an improved object detection and classification system can be implemented. In some examples, the various devices and/or components of environment 100 can include distributed computing resources 102 that can communicate with one another and with external devices via one or more network(s) 104.

For example, network(s) 104 can include public networks such as the Internet, private networks such as an institutional and/or personal intranet, or some combination of private and public networks. Network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 can utilize communications protocols, including packet-based and/or datagram-based protocols such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some examples, network(s) 104 can further include devices that enable connection to a wireless network, such as a wireless access point (WAP). Example embodiments support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, distributed computing resources 102 can include devices 106(1)-106(N). Embodiments support scenarios where device(s) 106 can include one or more computing devices that operate in a cluster or other grouped configuration to share resources, balance load, increase performance, provide fail-over support or redundancy, or for other purposes. Device(s) 106 can belong to a variety of categories or classes of devices such as traditional server-type devices, desktop computer-type devices, mobile devices, special purpose-type devices, embedded-type devices, and/or wearable-type devices. Thus, although illustrated as desktop and laptop computers, device(s) 106 can include a diverse variety of device types and are not limited to a particular type of device. Device(s) 106 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

Device(s) 106 can include any type of computing device having one or more processing unit(s) 108 operably connected to computer-readable media (CRM) 110 such as via a bus 112, which in some instances can include one or more of a system bus, a data bus, an address bus, a PCI bus, a Mini-PCI bus, and any variety of local, peripheral, and/or independent buses.

Executable instructions stored on CRM 110 can include, for example, an operating system 114, an object detection and classification network 116, an object proposal module 118, a proposal classifier module 120, and other modules, programs, or applications that are loadable and executable by processing units(s) 108. Additionally or alternatively, the functionally described herein can be performed, at least in part, by one or more hardware logic components such as accelerators. For example, and without limitation, illustrative types of hardware logic components that can be used include Field-Programmable Gate Arrays (FPGAs), Application-specific Integrated Circuits (ASICs), Application-Specific Standard Products (ASSPs), System-on-a-Chip systems (SOCs), Complex Programmable Logic Devices (CPLDs), etc. For example, an accelerator can represent a hybrid device, such as one from XILINX or ALTERA that includes a CPU course embedded in an FPGA fabric. Additional examples are discussed below with reference to FIG. 2.

Device 106 can also include one or more input/output (I/O) interfaces 122 to allow device 100 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, and the like). For simplicity, other components are omitted from the illustrated device 106.

Device 106 can also include one or more network interfaces 122 to enable communications between computing device 106 and other networked devices such as consumer computing device(s) 126 through which a consumer can submit an input (e.g., a query, an image, request for images, etc.). Such network interface(s) 122 can include one or more network interface controllers (NICs) or other types of transceiver devices to send and receive communications over a network.

Other devices involved in object detection and classification optimization, can include consumer computing devices 126(1)-126(N). Consumer computing device(s) 126 can belong to a variety of categories or classes of devices such as traditional consumer-type devices, desktop computer-type devices, mobile devices, special purpose-type devices, embedded-type devices, and/or wearable-type devices. Thus, although illustrated as mobile computing devices, which can have less computing resources than device(s) 106, consumer computing device(s) 126 can include a diverse variety of device types and are not limited to any particular type of device. Consumer computing device(s) 126 can include, but are not limited to, server computers or blade servers such as Web servers, map/reduce servers or other computation engines, or network-attached-storage units (e.g., 126(1)), laptop computers, thin clients, terminals, or other mobile computers, personal data assistants (PDAs), wearable computers such as smart watches or biometric or medical sensors, implanted computing devices such as biometric or medical sensors, computer navigation consumer computing devices, satellite-based navigation system devices including global positioning system (GPS) devices and other satellite-based navigation system devices (e.g., 126(2), represented graphically as a PDA), tablet computers or tablet hybrid computers (e.g., 126(3)), smartphones, mobile phones, mobile phone-tablet hybrid devices, or other telecommunication devices (e.g., 126(4)), portable or console-based gaming devices or other entertainment devices such as network-enabled televisions, set-top boxes, media players, cameras, or personal video recorders (PVRs) (e.g., 126(5), represented graphically as a camera), automotive computers such as vehicle control systems, or vehicle security systems (e.g., 126(K), represented graphically as an automobile), desktop computers (e.g., 126(1)), or integrated components for inclusion in computing devices, appliances, or other computing devices configured to participate in or carry out object detection and classification optimization as described herein.

Consumer computing device(s) 126 can represent any type of computing device having one or more processing unit(s) 128 operably connected to computer-readable media (CRM) 130 such as via a bus 132, which in some instances can include one or more of a system bus, a data bus, an address bus, a PCI bus, a Mini-PCI bus, and any variety of local, peripheral, and/or independent buses.

CRM described herein, e.g., CRM 110 and/or 130, include computer storage media and/or communication media. Computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, and/or storage media that can be used to store and maintain information for access by a computing device 106 or consumer computing device 126.

In contrast to computer storage media, communication media can embody computer-readable instructions, data structures, program modules, or other data in a modulated data signal, such as a carrier wave, or other transmission mechanism. As defined herein, computer storage media does not include communication media.

Executable instructions stored on CRM 130 can include an operating system 134 and other modules, programs, or applications that are loadable and executable by processing units(s) 128. Additionally or alternatively, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from XILINX or ALTERA that includes a CPU course embedded in an FPGA fabric.

Consumer computing device 126 can also include one or more I/O interfaces including one or more network interfaces 136 and user interfaces 138 to enable communications between consumer computing device 126 and other networked devices such as other consumer computing device(s) 126 or devices 106 over network(s) 104. Such network interface(s) 136 can include one or more network interface controllers (NICs) or other types of transceiver devices to send and receive communications over a network.

Consumer computing device 126 can also include a user interface 138 to enable the device 126 to receive user input, such as an image and a response to the input, such as an image with identified object categories. Additionally or alternatively, the user interface 138 can provide a display of objects and/or object classes in the image, and/or one or more images with similar objects and/or object classes.

Figure 2:
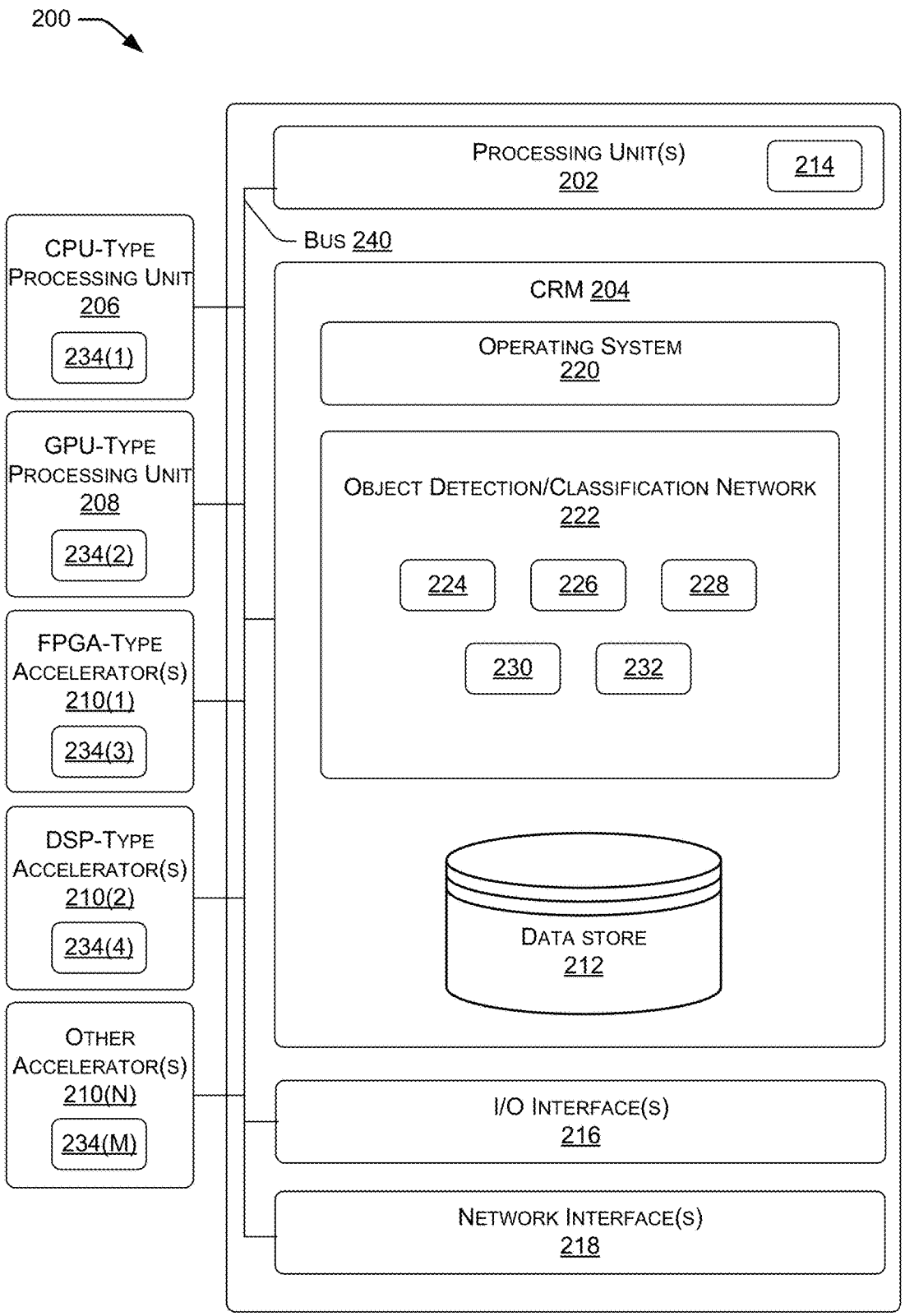
FIG. 2 is a block diagram depicting an example computing device configured to participate in an object detection and classification network.

FIG. 2 is a block diagram depicting an example computing device 200 configured to participate in an object detection and classification system. In some examples, computing device 200 may be one computing device of a distributed computing resource, such as a device 106 from FIG. 1. In device(s) 200, processing unit(s) 202, can include processing unit(s) 108 and can represent, for example, a CPU-type processing unit, a GPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

In some examples, CRM 204 can represent CRM 110 and can store instructions executable by the processing unit(s) 202, which as discussed above, can represent a processing unit incorporated in device 200. CRM 204 can also store instructions executable by external processing units such as by an external CPU-type processing unit 206, an external GPU-type processing unit 208, and/or executable by an external accelerator 210, such as an FPGA-type accelerator 210(1), a DSP-type accelerator 210(2), or any other accelerator 210(N). In various examples at least one CPU-type processing unit, GPU-type processing unit, and/or accelerator is incorporated in device 200, while in some examples one or more of a CPU-type processing unit, GPU-type processing unit, and/or accelerator is external to device 200.

In the illustrated example, CRM 204 can also include a data store 212. In some examples, data store 212 can include data storage such as a database, data warehouse, or other type of structured or unstructured data storage. In some examples, data store 212 can include a corpus and/or a relational database with one or more tables, indices, stored procedures, and so forth to enable data access such as web tables including one or more of hypertext markup language (HTML) tables, resource description framework (RDF) tables, web ontology language (OWL) tables, and/or extensible markup language (XML) tables, for example. Data store 212 can store data and/or instructions for the operations of processes, applications, components, and/or modules stored in CRM 204 and/or executed by processing unit(s) 202. Alternately, some or all of the above-referenced data and/or instructions can be stored on separate memories

214 on board one or more processing unit(s) 202 such as a memory on board a CPU-type processor, a GPU-type processor, an FPGA-type accelerator, a DSP-type accelerator, and/or another accelerator.

Device(s) 200 can further include one or more input/output (I/O) interfaces 216, which can be I/O interface 116 to allow device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, and the like). In addition, in device 200, network interface(s) 218, which can be network interface(s) 122, can represent, for example, network interface controllers (NICs) or other types of transceiver devices to send and receive communications over a network.

In the illustrated example, CRM 204 also includes an operating system 220, which can be operating system 114. CRM 204 also includes an object detection and classification network 222, which can be object detection and classification network 116. Object detection and classification network 222 can include one or more modules and/or APIs, which are illustrated as blocks 224, 226, 228, 230, and 232, although this is just an example, and the number can vary higher or lower.

Functionality described associated with blocks 224, 226, 228, 230 and 232, can be combined to be performed by a fewer number of modules and/or APIs or it can be split and performed by a larger number of modules and/or APIs. For example, block 224 can represent an input module with logic to program processing unit 202 of device 200 to deliver an input (e.g., an image) to the object detection and classification network 222 for processing.

Block 226 can represent an initial processing module with logic to program processing unit 202 to generate a convolutional feature map of the input. In various examples, the convolutional feature map can be a different version of the input image. In at least one example, the convolutional feature map can be a CONV5 feature map.

In some examples, the initial processing module can include a Deep Convolutional Neural Network (Deep CNN). In such examples, the Deep CNN can process the input image through multiple convolutional layers, maximum pooling layers, region of interest pooling layers, and/or fully-connected layers. The input image can be iteratively processed through each layer of the Deep CNN, and output as a convolutional feature map. The Deep CNN can be a Zeiler and Fergus model, a Simonyan and Zisserman model, or any convolutional neural network model.

Block 228 can represent an object proposal module with logic to program processing unit 202 to propose one or more candidate object locations (e.g., proposals) on the convolutional feature map. In various examples, the proposals can be represented in the form of bounding boxes, masking, edge detection, or other form of recognizing the location of candidate objects in an image.

In various examples, the object proposal module may include a Region Proposal Network (RPN), which may be a neural network. In such examples, the RPN can process the convolutional feature map and hypothesize candidate objects and corresponding locations thereof. Based on the hypothesis, the RPN can draw proposals in the form of a bounding box around each candidate object in the convolutional feature map. In various examples, the bounding box can be rectangular. However, in other examples, the bounding box can be circular, hexagonal, or other shape.

Block 230 can represent an object classifier module with logic to program processing unit 202 to evaluate the candidate objects proposed by the object proposal module. In various examples, the object classifier module can evaluate each proposal and determine a classification (e.g., a type, a class, a group, a category, etc.) of the candidate object in the proposal. In some examples, the classification of the object can be based on a pre-determined fixed number of object classes. For example, the object classifier can evaluate the object and determine that the object is one of the twenty (20) pre-determined object classes. For another example, the object classifier can evaluate the object and determine that the object is one of the thirty (30) pre-determined object classes. In other examples, the object classifier may receive updated classes of objects periodically.

In various examples, the object classifier module can calculate a confidence score. In such examples, the confidence score may be based on the degree of certainty that the object is of the object category to which it is assigned. For example, the object classifier module may determine that a candidate object is a human. Because the shape of the human body is so distinct, the object classifier module may determine that it is 95% certain that the object is a human, thus resulting in a confidence score of 0.95. For another example, the candidate object may be blurry or less a distinct angle of the human figure. Therefore, the object classifier module may have a lower confidence in the object class, and may assign a confidence score of, for example, 0.8.

In various examples, the object classifier module may include a region based convolutional neural network (R-CNN). In such examples, the R-CNN may be a Fast R-CNN.

Block 232 can represent a machine learning module with logic to program processing unit 202 of device 200 for extraction of a plurality of training images, corresponding object data for the training images (e.g., object category, location, number, etc.), and starting parameters. In some examples, the training images, corresponding object data, and starting parameters may be stored on computing device 200, such as, for example, in data store 212. In some examples, the training images, corresponding object data, and starting parameters can be extracted or received from a remote computing device, such as via the network interface 218, and stored in data store 212. In at least one example, the machine learning module can use training images, corresponding object data, and starting parameters from an image database, such as ImageNet.

In various examples, the machine learning module can train the object detection and classification system in a multi-step process. In such examples, the machine learning module can train the system using stochastic gradient descent and back-propagation. In some examples, the machine learning module can initialize the initial processing module, the object proposal module and the object classifier module with starting parameters. After initialization, the machine learning module can train the parameters of the initial processing and object proposal modules together using training images in order to output a convolutional feature map with trained proposals. The machine learning module may then train the parameters of the object classifier module with the trained proposals generated by the object proposal module.

Next, the machine learning module can re-initialize the initial processing module and the object proposal module using trained parameters generated in the above-described steps. In various examples, the trained parameters for initialization of the initial processing module can include frozen convolution layers (e.g., the convolution layers do not change). In some examples, the trained parameters for initialization of the object classification module can include frozen convolution layers and frozen parameters in the object proposal module.

After re-initialization of the initial processing module, the machine learning module can further train the parameters of the initial processing and object proposal modules together with training images to output a convolutional feature map with highly trained proposals. Finally, the machine learning module can train the object classifier module with the highly trained proposals generated by the object proposal module. The machine learning module can then set the trained parameters across the initial processing module, the object proposal module, and the object classifier module.

In various examples, the machine learning module can train the object detection and classification system in a single-step process using back-propagation. In such examples, the machine learning module may initialize the initial processing module, the object proposal module and the object classifier module with starting parameters. After initialization, the machine learning module can process a training image through the initial processing module, the object proposal module, and the object classifier module. Using back-propagation, the machine learning module can score the output proposals, classifications, and confidence scores based on data corresponding to the training image. The machine learning module can train the parameters in the initial processing module, the object proposal module, and the object classifier module, in order to improve the accuracy of the output object classifications and confidence scores.

In various examples, the machine learning module can train the system in an initial set-up. In other examples, the machine learning module can train the system periodically, such as, for example, at a specified time each week or month. In some examples, the machine learning module can obtain or access data to train the object detection and classification system when manually directed by the program manager.

Alternatively, some or all of the above-referenced data (e.g., training images and corresponding object data) can be stored on separate memories 234, such as memory 234(1) on board a CPU-type processing unit 206, memory 234(2) on board a GPU-type processing unit 208, memory 234(3) on board an FPGA-type accelerator 210(1), memory 234(4) on board a DSP-type accelerator 210(2), and/or memory 234 (M) on board another accelerator 210(N).

Bus 240, which can be bus 112, and which in some instances can include one or more of a system bus, a data bus, an address bus, a PCI bus, a Mini-PCI bus, and any variety of local, peripheral, and/or independent buses, can operably connect CRM 204 to processing unit(s) 202.

Figure 3:
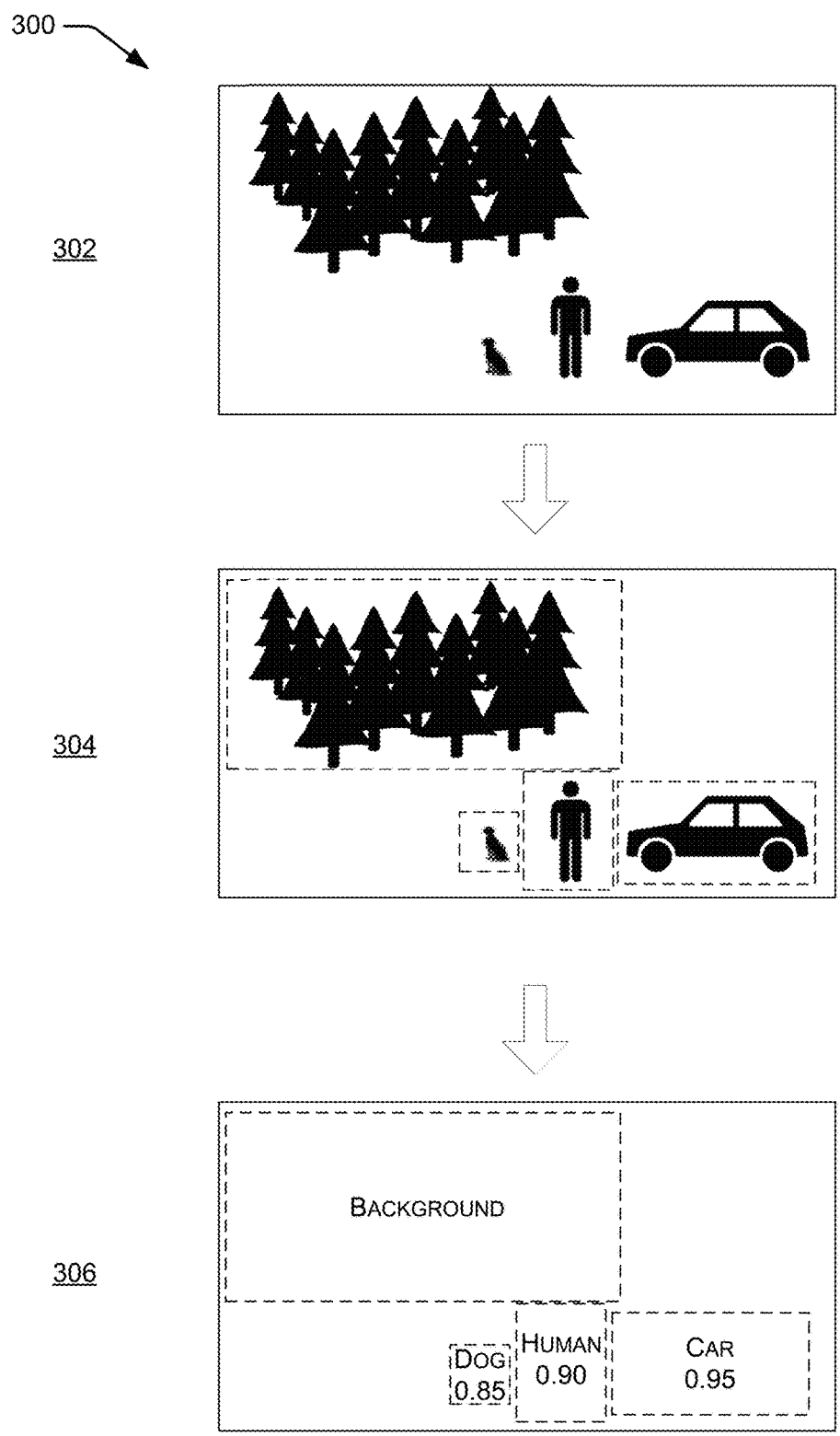
FIG. 3 is a pictorial flow diagram depicting an example process of an object detection and classification network.

FIG. 3 is a pictorial flow diagram depicting an example process of an object detection and classification network described above with respect to FIG. 2. In various examples, the object detection and classification network can be implemented by a plurality of networks that operate together to detect and classify objects in an image. The plurality of networks will be explained in greater detail below with regard to FIGS. 4 and 5.

At 302, a Deep Convolutional Neural Network (Deep CNN) can receive an input image. The input image may include one or more objects. In the illustrative example, the input image includes a human, a dog, a car, a forest of trees. In other examples, the input image can include a greater or lesser number of objects.

In various examples, the Deep CNN may process the input image through a plurality of layers. The layers may include convolutional layers and/or pooling layers. In some examples, the Deep CNN can include a Zeiler and Fergus model with 5 layers. In other examples, the Deep CNN can include a Simonyan and Zisserman model with 13 layers. In some examples, the Deep CNN can output a convolutional feature map. In at least one example, the convolutional feature map includes a CONV5 feature map.

At 304, the convolutional feature map can be input into a Region Proposal Network (RPN) for processing. In various examples, the RPN can process the convolutional feature map and hypothesize one or more candidate objects and locations thereof (e.g., proposals) on the convolutional feature map. In the illustrative example, based on the hypotheses, the RPN can generate a rectangular bounding box around each candidate object. In other examples, however, the bounding box may be of another shape (e.g., ovular, circular, hexagonal, etc.). Additionally or alternatively, the RPN can generate a mask, such as, for example, via edge detection, to substantially enclose the candidate object. In various examples, the RPN can output a processed convolutional feature map with proposals.

At 306, the convolutional feature map with proposals can be input into a proposal classifier. In various examples, the proposal classifier can be a component of a Region-Based Convolutional Neural Network, or other type of Convolutional Neural Network. In at least one example, the proposal classifier network can be a component of a Fast Region-Based Convolutional Neural Network (FRCN).

In various examples, the proposal classifier can evaluate each proposal in the convolutional feature map and determine a category (e.g. class, type, etc.) of object in the proposal. In some examples, the proposal classifier can determine an object category by comparing the object to pre-designated objects in the proposal classifier network (e.g., the FRCN). In some examples, if the proposal classifier does not recognize a category, it may designate the proposal as background. For example, as illustrated in FIG. 3, the forest in the input image is not recognized as one of the object categories. Thus, at 306, the forest is designated as background.

As illustrated at 306, the proposal classifier can output an object category for each proposal. Additionally, the proposal classifier can generate a confidence score associated with each object category. In various examples, the confidence score can be based on a similarity between the object in the proposal and an object associated with a pre-defined object category. In such examples, the object associated with the pre-defined object category may be learned from a training image. The similarity can be based on object curves, size, aspect, angles, or other characteristics of the objects. In some examples, the confidence score may be calculated for each proposal. In other examples, the confidence score may be calculated for each proposal except for those designated as background.

Figure 4:
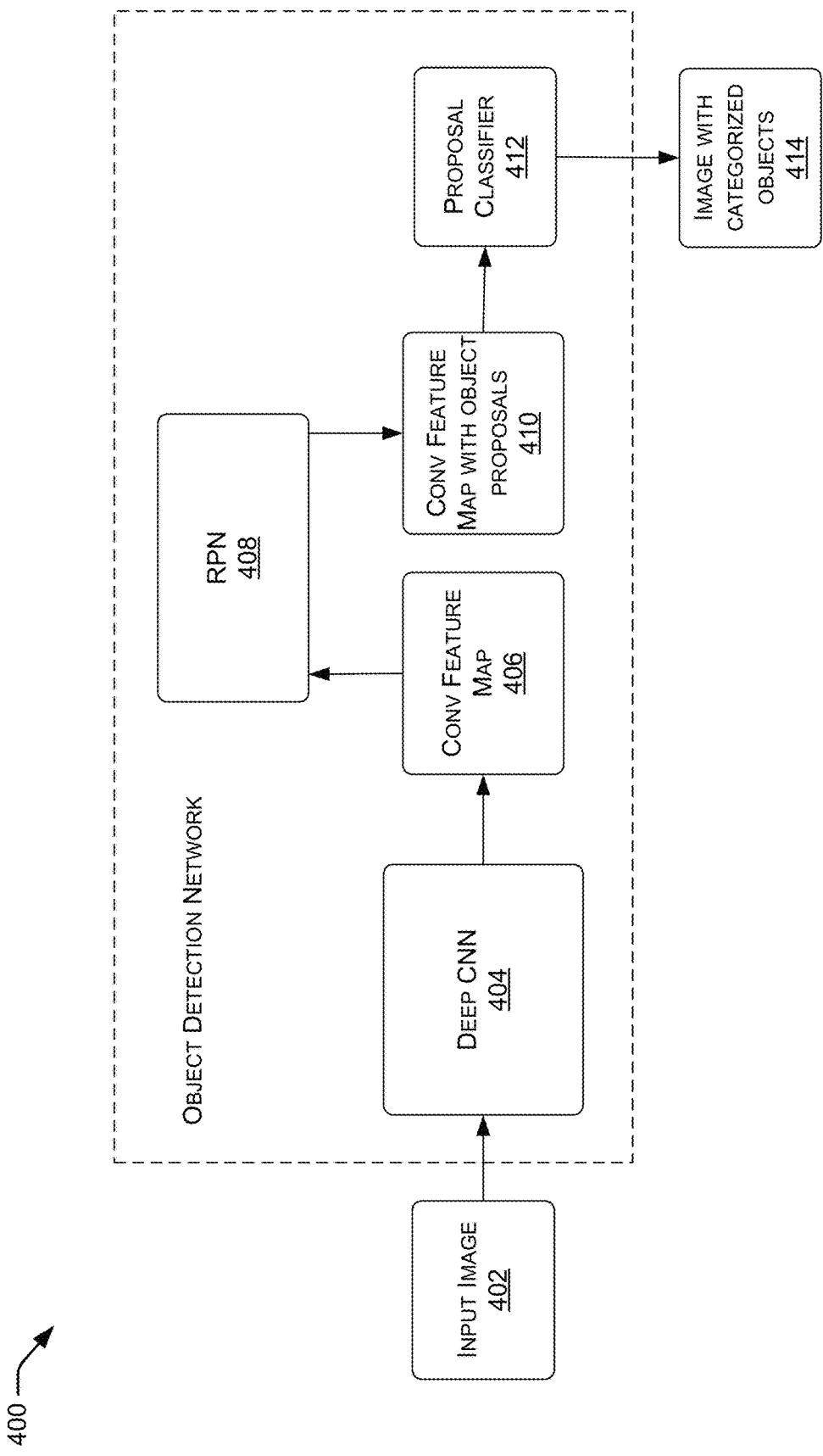
FIG. 4 is a dataflow diagram depicting an example architecture of the process of the object detection and classification network described in FIG. 3.

FIG. 4 is a dataflow diagram depicting an example architecture of the process of the object detection and classification network 400 described in FIG. 3.

At 402, object detection and classification network 400 can receive an input image. In various examples, the input image can be received from a consumer computing device, such as consumer computing device 126.

At 404, a Deep Convolutional Neural Network (Deep CNN) may receive the input image. The input image may include one or more objects. For example, as depicted in FIG. 3, the input image can include a human, a dog, a car, and a forest. In other examples, the input image can include a greater or lesser number of objects.

In various examples, the Deep CNN can process the input image through a plurality of layers. The layers can include convolutional layers, pooling layers, and/or other types of processing layers. The Deep CNN can include a Zeiler and Fergus model with 5 layers, a Simonyan and Zisserman model with 13 layers, or another Deep CNN model with a plurality of layers.

In some examples, at each layer, the Deep CNN can process the input image and adjust and/or resize the input image in order to make the objects in the image easier to detect by subsequent mini-networks in the object detection and classification network 400.

At 406, the Deep CNN can output a convolutional feature map. In at least one example, the convolutional feature map includes a CONV5 feature map.

At 408, the convolutional feature map can be input into a Region Proposal Network (RPN). In various examples, the RPN can include a component that evaluates the image presented on the convolutional feature map at each of a plurality of points to determine if an object or portion thereof is located at the point. In some examples, the RPN can calculate an objectness score. In such examples, if the objectness score is above a threshold, the RPN can determine that an object or portion thereof is located at a particular point. In various examples, the plurality of points may include a plurality of grid points. In such examples, the grid points may be points on a line grid, a curve, a sector, a radius, or other delineation of a section of the convolutional feature map.

Based on the determination at each of the plurality of grid points, the RPN can identify a proposal for a candidate object (e.g., candidate object location). In other words, the RPN can determine where a candidate object (e.g., a potential object in the image) is located, and can identify the candidate object with a proposal. The proposal can be depicted as a rectangular bounding box, a mask, or other type and/or shape designating the location as a candidate object. The RPN will be discussed in greater detail with regard to FIG. 5.

At 410, the RPN can output a processed convolutional feature map with proposals. In various examples, the convolutional feature map can include a greater number of proposals than objects in the image.

At 412, the convolutional feature map with proposals can be input into a proposal classifier. In various examples, the proposal classifier can evaluate each proposal in the convolutional feature map and determine whether a proposal designates an object in the image. In some examples, the proposal classifier can evaluate the proposals that designate an object, and determine a category (e.g. class, type, etc.) of each object in the proposal. In some examples, the proposal classifier can compare the proposal to a set of object categories, and determine an object category based similarity of features between the proposal and the object category. In at least one example, the proposal classifier can include a set of twenty (20) object categories. In other examples, the set can include a greater or lesser number of object categories, such as fifteen (15) object categories, or twenty-five (25) object categories.

In some examples, responsive to a failure to match an object in a particular proposal to an object category, the proposal classifier can designate the object in the particular proposal as background.

In various examples, the set of object categories can be fixed upon initialization. In some examples, the set of object categories may increase and/or decrease periodically based on a recognized need. For example, a program manager may recognize a need to add a category for cats based on a trend of searching for images associated with cats. In such an example, the program manager may initiate a machine learning module, such as the machine learning module described in FIG. 2, to train the network to recognize cats in an image.

At 414, the proposal classifier can output an image with the categorized objects associated with the proposals. Additionally, the proposal classifier can generate a confidence score associated with each object category. In various examples, the confidence score can be based on a degree of similarity between the object in the proposal and an object associated with a pre-defined object category. In such examples, the object associated with the pre-defined object category may be learned from a training image. The degree of similarity can be based on object curves, size, aspect, angles, or other characteristics of the objects. In some examples, the confidence score can be based on a probability that the object is what the proposal classifier believes it to be. In some examples, the confidence score may be calculated for each proposal. In other examples, the confidence score may be calculated for each proposal except for those designated as background.

Figure 5:
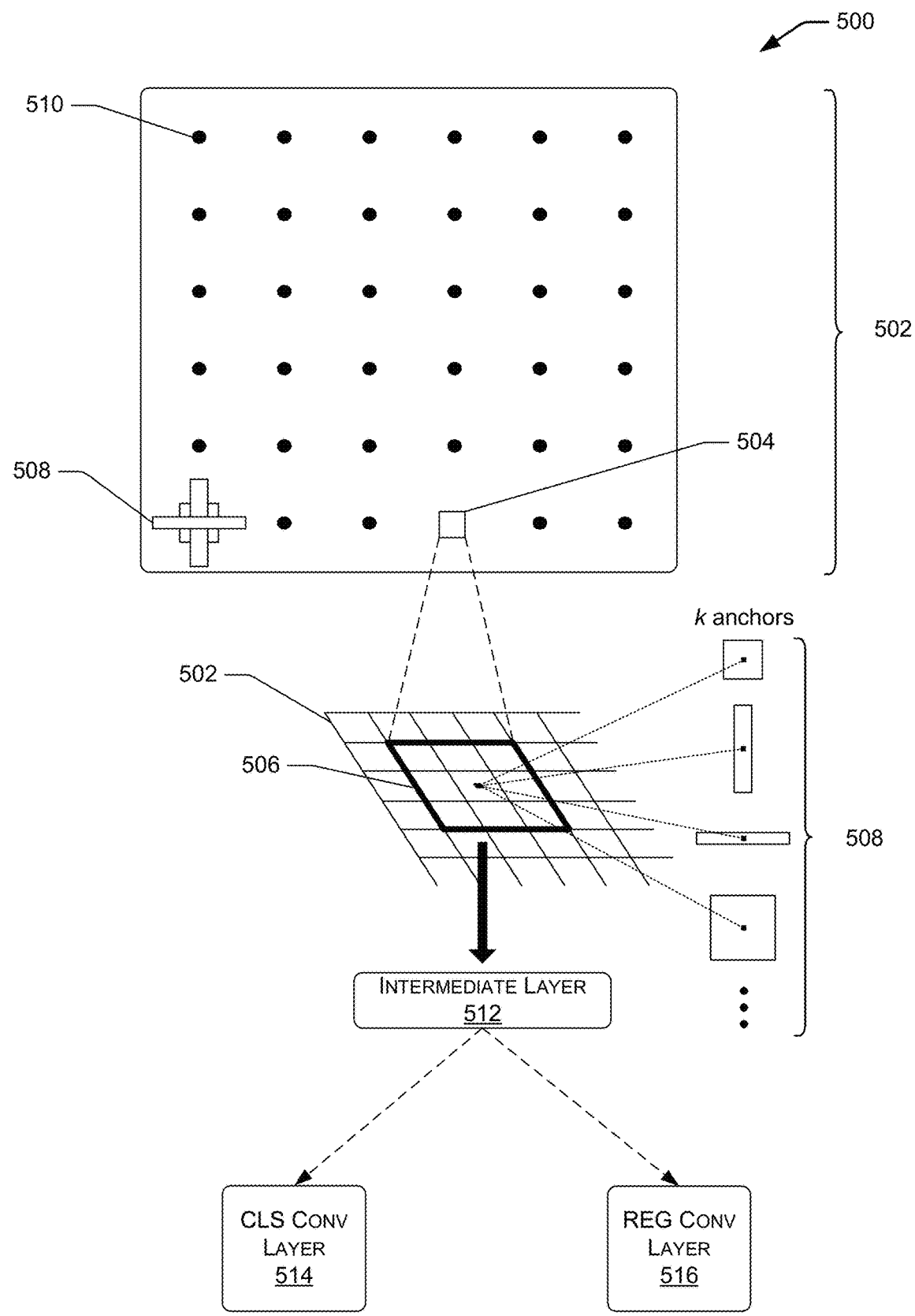
FIG. 5 is an illustrative representation of a Region Proposal Network used in the object detection and classification network described in FIGS. 1-4.

FIG. 5 is an illustrative representation of a Region Proposal Network (RPN) 500 used in the object detection and classification network described in FIGS. 1-4. As discussed above, the RPN 500 can input a convolutional feature map 502 from the Deep Convolutional Neural Network (Deep CNN), identify candidate objects (e.g., potential objects) in an image on the convolutional feature map 502, and generate a proposal over the candidate objects.

In various examples, the RPN 500 can include a component configured to identify the candidate objects. In some examples, the component may include n×n convolutional layers 504. As illustrated in FIG. 5, the convolutional layers 504 can be in a 3×3 configuration. In other examples, the convolutional layer 504 can be in a larger or smaller configuration. In various examples, the n×n convolutional layers 504 can be a sliding window 506.

As illustrated in FIG. 5, the RPN 500 component can include k anchors 508 centered in the sliding window 506. In various examples, the anchors 508 can be associated with a scale and aspect ratio. In such examples, the number of anchors 508 can be based on the number of scales and aspect ratios. In at least one example, the anchors 508 include 3 anchors of different aspect ratios (e.g., 1:1, 2:1, 1:2), and 3 scales (e.g., scales with box areas of $128^2$, $256^2$, and $512^2$) of each of the aspect ratios, for a total of k=9 anchors. In other examples, the number of anchors 508 ($k$) may be higher or lower.

In various examples, the RPN 500 component can be configured to identify the candidate objects by applying the sliding window 506 with anchors 508 at each of a plurality of points 510 in the convolutional feature map 502 in order to determine if an object or part thereof is present at that point 510. In some examples, the number of points 510 can be determined by the size of the input image. For example, an image of 228 pixels can include a greater number of points than an image of 171 pixels. Regardless of the number of points 510 in the convolutional feature map, the component can apply the same sliding window 506, anchors 508 and functions thereof at each point 510. In other words, the RPN 500 component can be translation invariant.

In various examples, the sliding window 506 can be mapped to an intermediate layer 512. In such examples, the intermediate layer 512 can be a lower dimensional vector. For example, in networks using a Zeiler and Fergus model deep CNN, the sliding window can be mapped to a 256-d vector. For another example, in networks using a Simonyan and Zisserman model deep CNN, the sliding window can be mapped to a 512-d vector.

In some examples, intermediate layer 512 can be fed into two convolutional layers, a box-classification layer (CLS cony layer) 514 and a box-regression convolutional layer (REG cony layer) 516. In various examples, the CLS cony layer 514 and the REG cony layer 516 can be 1×1 convolutional layers. In other examples, the CLS cony layer 514 and the REG cony layer 516 can be a larger or smaller size. In at least one example, the CLS cony layer 514 and the REG cony layer 516 can be fully-connected layers.

In various examples, the CLS cony layer 514 can be configured to calculate an objectness score for each of the k anchors 508. The objectness score can be based on a probability that an object, or part thereof, is co-located with an anchor 508. In some examples, the objectness score, the CLS cony layer 514 can be based on an Intersection-over-Union (IoU) overlap with a ground-truth box (e.g., ground-truth item). In such examples, the objectness score can be the overlap ratio, or a function thereof.

Additionally or alternatively, the CLS cony layer 514 can assign a class label to each anchor 508. In such examples, the class label can be based at least in part on the overlap with the ground-truth box, and thus can provide an indication of an object being located at the anchor 508 or not. The class label can be positive, indicating that an object is located at the anchor 508, or negative, indicating that no object is located at the anchor 508. In various examples, the class label can be neutral, indicating that an insignificant amount of the anchor 508 covers an object. In such examples, however, the neutral indications and associated anchors can be ignored by the RPN 500 component.

In at least one example, an anchor with a highest overlap with a particular ground-truth box and an anchor with an IoU overlap greater than 0.7 with any ground-truth box can be labeled positive. Additionally, a non-positive anchor with an IoU overlap less than 0.3 for all ground-truth boxs can be labeled as negative.

In various examples, the REG cony layer 516 can be configured to calculate four coordinate values for each anchor. In such examples, the coordinate values can include, for example, $t_x$, $t_y$, $t_w$, and $t_h$. In some examples, the REG cony layer 516 can take the coordinate values for the anchors, and calculate a shift in the center $(t_x, t_y)$ of each of the anchors 508, and a shift in the height and width $(t_x, t_y)$ (e.g., scale) of each of the anchors 508. In such examples, the anchors can be adjusted in shift and scale to most effectively cover the object.

In various examples, the RPN 500 component can use non-maximum suppression to determine the anchors that can provide the basis for each proposal. In such examples, the RPN 500 component can take the anchor with the highest objectness score (e.g., highest IoU overlap ratio) at a particular point, and suppress all other anchors at the particular point. Additionally, the component of the RPN 500 can suppress other anchors that overlap significantly with the highest scoring anchors, but have lower objectness scores. Thus, the RPN 500 component can reduce the number of anchors that are used to determine proposals and the number of anchors that are output to the proposal classifier. In various examples, the maximum number of non-suppressed anchors can be 300 anchors. In other examples, the maximum number of non-suppressed anchors can be higher or lower.

In various examples, the RPN 500 component can apply the shifted and scaled non-suppressed anchors calculated by the REG cony layer 516 to determine the proposal. In such examples, the proposal can include a bounding box around the shifted and scaled non-suppressed anchors. As discussed above, the RPN 500 can output the convolutional feature map with proposals. The convolutional feature map with proposals can be input into the proposal classifier for object classification. In various examples, the RPN 500 and the proposal classifier can share multiple convolutional layers, thus improving the speed of the object detection and classification network. To ensure the accuracy of the object detection and classification network, the RPN can be trained with training images. A discussion of the object detection and classification network training will be discussed in greater detail with regard to FIG. 7.

RPN Training

In various examples, the computing system can use machine learning techniques to train the RPN to identify proposals. In such examples, the computing system can train the RPN to recognize if an anchor overlaps an object in the image, and if so, how to shift and scale the anchor to most effectively cover the object. The term "machine learning" may refer to one or more programs that learns from the data it receives. For example, a machine learning mechanism may build, modify or otherwise utilize a model that is created from example inputs, and the machine learning mechanism can make predictions or decisions using the model. In the current example, machine learning can be used to improve the proposal generation (e.g., candidate object detection) in images.

In various examples, the computing system can train the RPN 500 on single-scale images. In some examples, the images can be re-scaled such that the shorter side is s=600 pixels. As discussed above, the anchors can include (n×n) scale and aspect ratio. In at least one example, the anchors can include 3 scales with box areas of $128^2$, $256^2$, and $512^2$, and 3 aspect ratios of 1:1, 1:2, and 2:1.

In some examples, the RPN 500 can be initialized with a known pre-trained model including one or more parameters. For example, the RPN can be initialized with an ImageNet pre-trained model.

After initialization, the computing system can assign a positive label to an anchor 508 that has a highest Intersection-over-Union (IoU) overlap with a ground-truth item, and an anchor 508 that has an IoU overlap higher than a pre-determined percentage with a ground-truth box. In various examples, the pre-determined percentage can be 70%. In some examples, the predetermined percentage can be higher or lower than 70%. For example, the predetermined percentage can be 65%. For another example, the predetermined percentage can be 75%.

In some examples, a single ground-truth box may result in the computing system assigning a positive label to multiple anchors 508. In other words, one or more anchors may overlap each other and a ground-truth box by a large enough ratio to assign a positive label to the one or more anchors. In various examples, the computing system can ignore cross-boundary anchors, thereby reducing the number of anchors per image. For example, a typical 1000×600 image has approximately 20,000 anchors. With cross-boundary anchors ignored, only 6,000 anchors are considered per training image.

In various examples, the computing system can assign a negative label to a non-positive anchor 508 with an IoU ratio lower than 0.3 for all ground-truth boxs.

In some examples, the computing system can minimize an objective function of the RPN. For an anchor box i, the loss function is defined as:

$$L(p_i,t_i)=L_{cls}(p_i,p_i^*)+\lambda p_i^* L_{reg}(t_i,t_i^*), \quad (1)$$

where $p_i$ is the predicted probability of the anchor i being an object. $p_i^*$ is 1 if the anchor is labeled positive, and is 0 if the anchor is negative. $t_i=\{t_x, t_y, t_w, t_h\}_i$ represents the 4 parameterized coordinates of the predicted bounding box, and $t_i^*=\{t_x^*, t_y^*, t_w^*, t_h^*\}_i$ represents the ground-truth box associated with a positive anchor. The classification loss $L_{cls}$ is the softmax loss of two classes (object vs. not object).

In various examples, the regression loss can be defined as:

$$L_{reg}(t_i,t_i^*)=R(t_i-t_i^*) \quad (2)$$

where R is a robust loss function (smooth-Li). The term $p_i^* L_{reg}$ means the regression loss is activated only for positive anchors ($p_i^*=1$) and is disabled otherwise ($p_i^*=0$). The loss balancing parameter $\lambda$ can be set to 10, to bias toward better box locations. In various examples, the outputs of the CLS cony layer 514 and REG cony layer 516 can be $\{p_i\}$ and $\{t_i\}$, respectively.

In various examples, the computing system can adopt the parameterizations of the 4 coordinates as follows:

$$t_x = \frac{(x-x_a)}{w_a}, t_y = \frac{(y-y_a)}{h_a}, t_w = \log(w/w_a), t_h = \log(h/h_a), \quad (3)$$

$$t_x^* = \frac{(x^*-x_a)}{w_a}, t_y^* = \frac{(y^*-y_a)}{h_a}, t_w^* = \log(w^*/w_a), t_h^* = \log(h^*/h_a), \quad (4)$$

where x, $x_a$, and x* are for the predicted box, anchor box, and ground-truth box respectively. In some examples, the features used for regression are of the same spatial size (n×n) on the feature maps. To account for varying sizes, a set of k bounding-box regressors are learned. Each regressor is responsible for one scale and one aspect ratio. In various example, the k regressors do not share weights. In such examples, boxes of various sizes can be predicted despite the features being a fixed size and/or scale.

In various examples, the RPN 500 can be trained end-to-end by back-propagation and stochastic gradient descent (SGD). The SGD is but one illustrative example algorithm that the machine learning module can apply with back-propagation to train an RPN model. Other examples can use a limited-memory Broyden-Fletcher-Goldfarb-Shanno (BFGS) algorithm, an orthant-wise limited-memory quasi-Newton (OWL-QN) algorithm, or any other algorithm for candidate object proposal optimization.

In some examples, the RPN 500 training can be optimized by randomly sampling 256 anchors in an image to compute the loss function of a mini-batch, where the sampled positive and negative anchors have a ratio of 1:1. As described above, the shared convolutional layers are initialized by pre-training a model for classification, such as, for example, ImageNet classification. New layers (i.e., non-shared convolution layers) can be initialized by drawing weights from a zero-mean Gaussian distribution with standard deviation 0.01.

In various examples, after initialization of the layers, the computing system can set one or more learning rates to be implemented on a dataset. In at least one example, the computing system can set a learning rate of 0.001 for the first 60,000 mini-batches, and 0.0001 for the next 20,000 mini-batches can be implemented on the dataset. In at least one example, the dataset can be a PASCAL dataset. Additionally, the computing system can set a momentum and a weight decay. In at least one example, the momentum can be 0.9 and the weight decay can be 0.0005.

In various examples, the computing system can train the RPN 500 on single-scale images. In some examples, the images can be re-scaled such that the shorter side is s=600 pixels. As discussed above, the anchors can include (n×n) scale and aspect ratio. In at least on example, the anchors can include 3 scales with box areas of $128^2$, $256^2$, and $512^2$, and 3 aspect ratios of 1:1, 1:2, and 2:1.

As will be discussed in greater detail below, the computing system can train the RPN 500 simultaneously with the Deep CNN, to produce a convolutional feature map with accurate proposals. The convolutional feature map can be input into a FRCN proposal classifier, which shares multiple convolutional layers with the RPN 500. Because of the shared convolutional layers, the speed of the overall object detection and classification network is dramatically increased over previous object detection and classification models. The RPN 500 training, as described above, ensures the accuracy of the proposals is at least equivalent to previous models.

Illustrative Processes

Figure 6:
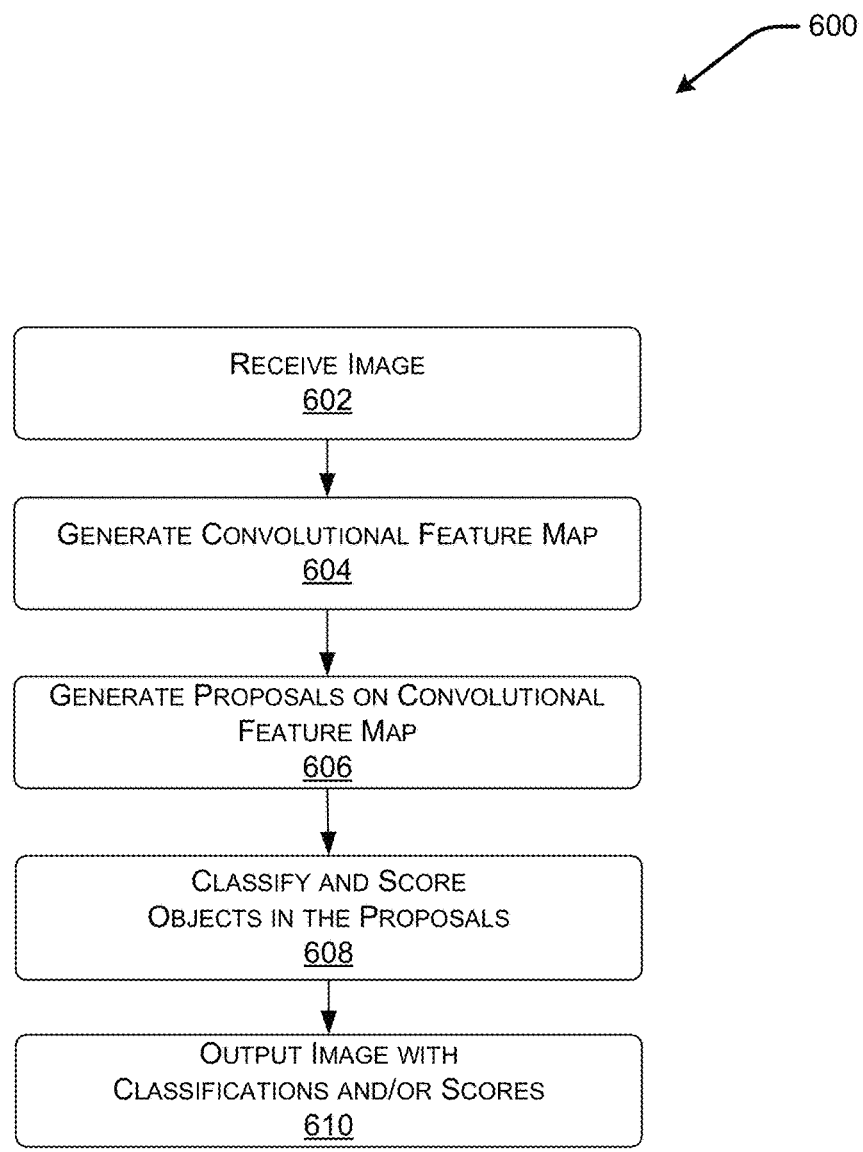
FIG. 6 is a flow diagram that illustrates a process flow of an object detection and classification network.
Figure 7:
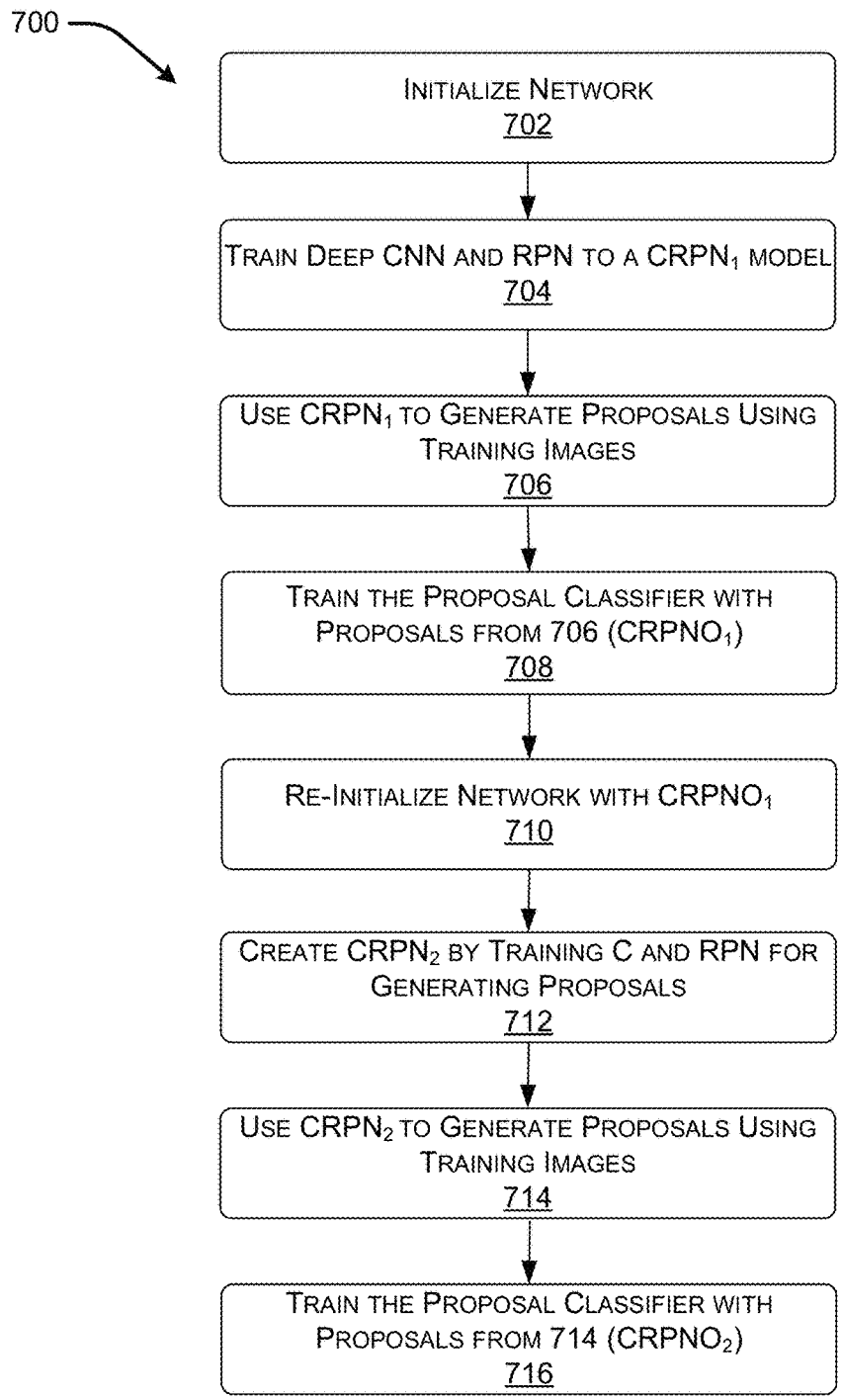
FIG. 7 is a flow diagram that illustrates a process flow of training one or more parameters of an object detection network described herein.

FIGS. 6 and 7 are flow diagrams depicting example processes for an object detection and classification network and training the object detection and classification network, respectively. The operations of the example process are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes.

FIG. 6 is a flow diagram that illustrates a process flow 600 of an object detection and classification network.

At block 602, the computing system can receive an image. In various examples, the image can be received from a remote computing device, such as consumer computing device 126 via a network, such as network(s) 104. In some examples, the image may be received from a data store, such as data store 212 on computing device 200.

At block 604, the computing system can process the image through a Deep Convolutional Neural Network (Deep CNN) to generate a convolutional feature map corresponding to the image. In various examples, the Deep CNN can include a plurality of layers. The layers may include convolutional layers and/or pooling layers. In some examples, the Deep CNN can be a Zeiler and Fergus model with 5 layers. In other examples, the Deep CNN can be a Simonyan and Zisserman model with 13 layers.

At block 606, the computing system can input the convolutional feature map into a Region Proposal Network (RPN) to generate proposals on the convolutional feature map. In various examples, the RPN can process the convolutional feature map and hypothesize one or more candidate objects and locations thereof (e.g., proposals) on the convolutional feature map. In some examples, the proposals can be rectangular bounding boxes that substantially surround each candidate object. In other examples, the proposals can be other shapes and/or types of candidate image location recognition.

In various examples, the RPN can apply a translation invariant component to each of a plurality of points on the convolutional feature map to determine if an object or portion thereof is located at the point. In some examples, the component can include convolutional layers. In such examples, one or more of the convolutional layers of the RPN component can be shared with the proposal classifier, located downstream in processing. Thus, the proposal classifier can benefit from calculations previously computed by the RPN, and the object detection and classification network may process images faster than previous network designs.

Additionally, the RPN component can include anchors associated with a scale and an aspect ratio. In at least one example, the anchors can include 3 aspect ratios (e.g., 1:1, 2:1, 1:2), and 3 scales (e.g., scales with box areas of $128^2$, $256^2$, and $512^2$) of each of the aspect ratios, for a total of k=9 anchors. In other examples, the number of anchors (k) may be higher or lower.

In various examples, the RPN can determine an objectness score for each of the anchors at each point. In some examples, the RPN can apply non-maximum suppression and suppress all anchors but the highest scoring anchor at each point. Additionally, the RPN can suppress overlapping anchors that have lower scores than the anchor with which it overlaps. In at least one example, the RPN can suppress all but 300 anchors for processing.

In various examples, the RPN can generate the proposals based on the non-suppressed anchors (e.g., the 300 anchors in the above example). In such examples, the proposals can be identify candidate objects in the image on the convolutional feature map.

At block 608, the computing system can input the convolutional feature map with proposals into a proposal classifier. In various examples, the proposal classifier can be a proposal classifier of a Fast Region-Based Convolutional Neural Network (FRCN). In other examples, the proposal classifier can be associated with a Region-Based Convolutional Neural Network (R-CNN), or other type of neural network.

In various examples, the proposal classifier can evaluate each proposal in the convolutional feature map and determine a category (e.g. class, type, etc.) of each object in the proposal. In some examples, the proposal classifier can determine an object category by comparing the object to pre-designated objects in the network, such as the FRCN. In some examples, if the proposal classifier does not recognize a category, it may designate the proposal as background.

In various examples, the proposal classifier can generate a confidence score for the proposals. In such examples, the score can be a measure of how confident the proposal classifier is that the object is, in fact, of the determined category. In some examples, the confidence score can be based on a similarity of features (e.g., object curves, size, aspect, angles, or other characteristics of the objects) between the candidate object in the proposal and a pre-designated object. In some examples, the confidence score may be calculated for each proposal. In other examples, the confidence score may be calculated for each proposal except for those designated as background.

At block 610, the computing system can output an image with the classifications and/or scores determined at block 608.

FIG. 7 is a flow diagram that illustrates a process flow 700 of training a model to detect and classify objects in an image. As discussed above with regard to FIG. 5, the computing system can use machine learning techniques to detect and classify objects in an image. The term "machine learning" may refer to one or more programs that learns from the data it receives. For example, a machine learning mechanism may build, modify or otherwise utilize a model that is created from example inputs, and the machine learning mechanism can make predictions or decisions using the model. In the current example, machine learning can be used to improve the detection and classification of images. The model may be trained using supervised and/or unsupervised learning. For instance, over time, as the machine learning mechanism receives more training images, the object classifications can be updated based on training image data.

In various examples, the training can be completed once upon system initialization. In some examples, the computing system can update the training at a periodic interval (e.g., annually, monthly, weekly, etc.). In some examples, the computing system can update the training when commanded, such as, for example, by a program manager. In such examples, the command to update the training may be via a network interface and/or an I/O interface.

In some examples, the training can be completed while the computing system is in an online and/or offline mode. In some examples, the computing system may receive training images and corresponding object data for the training images (e.g., object category, location, number, etc.) from a source. In some examples, the computing system may receive training images and corresponding object data directly from a user device. The computing system may save the training images and corresponding data, such as, for example, in a data store.

In various examples, the computing system can train the network end-to-end using back-propagation and a stochastic gradient descent (SGD) algorithm. The SGD is but one illustrative example algorithm that the machine learning module can apply to train a model for object detection and classification optimization. Other examples can use a limited-memory Broyden-Fletcher-Goldfarb-Shanno (BFGS) algorithm, an orthant-wise limited-memory quasi-Newton (OWL-QN) algorithm, or any other algorithm that can be used for training one or more parameters.

At block 702, the computing system can initialize one or more parameters in the network. In various examples, the computing system can initialize the Deep CNN, RPN and FRCN proposal classifier with parameters from a pre-trained model, such as an ImageNet pre-trained model.

At block 704, the computing system can train the Deep CNN and RPN together into a $CRPN_1$ model configured to generate image proposals on a convolutional feature map. The training of the RPN is discussed in detail above with regard to FIG. 5. In some examples, training may result in adjustments to one or more parameters of the Deep CNN and/or RPN.

At block 706, the computing system can use the $CRPN_1$ model to generate object proposals on a convolutional feature map using training images.

At block 708, the computing system can input the proposals generated at block 706, and train the FRCN proposal classifier. As an illustrative example, the output trained model can be referred to as CRPNO$_1$.

At block 710, the computing system can re-initialize the network with one or more parameters of the CRPNO$_1$ model. In various examples, the computing system can freeze the convolution layers of the CRPNO$_1$ model. In such examples, the convolution layers do not change across the network. Additionally, the computing system can freeze the RPN parameters during the re-initialization of the FRCN proposal classifier.

At block 712, the computing system can create a second model, CRPN$_2$ by training the Deep CNN and RPN together for generating proposals.

At block 714, the computing system can use the CRPN$_2$ model to generate object proposals using training images.

At block 716, the computing system can input the proposals generated at block 714, and train the FRCN proposal classifier. As an illustrative example, the output final model can be referred to as CRPNO$_2$.

Example Clauses

A: A system comprising: a processor; a computer-readable media including instructions for an object detection and classification network, for actuation by the processor, the object detection and classification network comprising: an initial processing module configured to input an image and generate a convolutional feature map; an object proposal module configured to generate, by a first type of neural network, a proposal corresponding to a candidate object in the image; a proposal classifier module configured to assign, by a second type of neural network, a category associated with the candidate object.

B: A system as paragraph A describes, wherein the proposal classifier module is further configured to assign a confidence score to the classification.

C: A system as either paragraph A or paragraph B describes, wherein the first type of neural network comprises a translation invariant component configured to: classify an anchor based on overlap with a ground-truth box; and predict a shift and a scale of the anchor.

D: A system as any of paragraphs A-C describe, wherein the object proposal module is further configured to: generate one or more anchors at a point of the image; determine an overlap of each anchor of the one or more anchors to a ground-truth box; assign a label to each anchor of the one or more anchor based at least in part on the overlap; assign a score to the label based at least in part on the overlap; select an anchor with a highest score; and generate the proposal based at least in part on the highest score.

E: A system as any of paragraphs A-D describe, wherein the object proposal module is further configured to: identify an anchor corresponding to a highest score, the highest score corresponding to a percentage of the overlap; shift the anchor corresponding to the highest score to better define the candidate object; and scale the anchor corresponding to the highest score to better define the candidate object.

F: A system as any of paragraphs A-E describe, further comprising a machine learning module configured to: train one or more parameters of the initial processing module and the object proposal module to generate one or more proposals on a training image; and train one or more parameters of the proposal classifier module to assign a category to each of the one or more proposals on the training image.

G: A system as any of paragraphs A-E describe, further comprising a machine learning module configured to train the one or more parameters of the initial processing module, the object proposal module, and the proposal classifier module using one or more of: stochastic gradient descent; or back-propagation.

H: A system as any of paragraphs A-G describe, wherein the input processing module includes a Zeiler and Fergus model or a Simonyan and Zisserman model deep convolutional neural network.

I: A method, comprising: receiving an input image; generating a convolutional feature map; identifying, by a first type of neural network, a candidate object in the input image; determining, by a second type of neural network, a category of the candidate object; and assigning a confidence score to the category of the candidate object.

J: A method as paragraph I describes, wherein the first type of neural network comprises a translation invariant component configured to: classify an anchor based on overlap with a ground-truth box; and predict a shift and a scale of the anchor.

K: A method as either paragraph I or paragraph J describes, wherein the identifying the candidate object in the input image comprises: generating one or more anchors at a point of the input image; determining an overlap of individual ones of the one or more anchors to a ground-truth box; assigning a label to each anchor of the one or more anchors based at least in part on the overlap; assigning a score to the label based at least in part on the overlap; and identifying the candidate object at the point based at least in part on the score.

L: A method as paragraph K describes, wherein the identifying the candidate object in the input image further comprises: identifying an anchor corresponding to a highest score, the highest score corresponding to a percentage of the overlap; shifting the anchor corresponding to the highest score to better define the candidate object; and scaling the anchor corresponding to the highest score to better define the candidate object.

M: A method as paragraph K describes, wherein the generating the one or more anchors at the point of the input image comprises generating a set of anchor boxes, the set anchor boxes having three scales and three aspect ratios.

N: A method as paragraph K describes, wherein the label is positive when the overlap exceeds a threshold level.

O: A method as any of paragraphs I-N describe, wherein the convolutional feature map is generated by a Zeiler and Fergus model or a Simonyan and Zisserman model deep convolutional neural network.

P: A method as any of paragraphs I-O describe, further comprising training the convolution feature map, the first type of neural network, and the second type of neural network using one or more of: stochastic gradient descent; or back-propagation.

Q: A computer-readable medium having thereon computer-executable instructions that, responsive to execution, configure a computer to perform a method as any of paragraphs I-O describes.

R: A device or system comprising: a processor; and a computer-readable medium coupled to the processor, the computer-readable medium including instructions to configure one or more devices to perform a method as any of paragraphs I-O describes.

S: A system comprising: means for receiving an input image; means for generating a convolutional feature map; means for identifying, by a region proposal network (RPN), a candidate object in the input image; means for determining, by a fast region based convolutional neural network (FRCN), a category of the candidate object; and means for assigning a confidence score to the category of the candidate object.

T: A system as paragraph S describes, wherein the RPN comprises a translation invariant component configured to: classify an anchor based on overlap with a ground-truth box; and predict a shift and a scale of the anchor.

U: A system as paragraph S or paragraph T describes, wherein the means for identifying the candidate object in the input image comprises: means for generating one or more anchors at a point of the input image; means for determining an overlap of individual ones of the one or more anchors to a ground-truth box; assigning a label to each anchor of the one or more anchors based at least in part on the overlap; means for assigning a score to the label based at least in part on the overlap; and means for identifying the candidate object at the point based at least in part on the score.

V: A system as paragraph U describes, wherein the means for identifying the candidate object in the input image further comprises: means for identifying an anchor corresponding to a highest score, the highest score corresponding to a percentage of the overlap; means for shifting the anchor corresponding to the highest score to better define the candidate object; and means for scaling the anchor corresponding to the highest score to better define the candidate object.

W: A computer-readable medium having thereon computer-executable instructions, the computer-executable instructions responsive to execution configuring a device to perform operations comprising: receiving an input image; generating a convolutional feature map; identifying, by a region proposal network (RPN), a candidate object in the input image; determining, by a proposal classifier, a category of the candidate object; and assigning, by the proposal classifier, a confidence score to the category of the candidate object.

X: A computer-readable medium as paragraph W describes, wherein the determining the category of the candidate object comprises evaluating the candidate object by a fast region based convolutional neural network.

Y: A computer-readable medium as either paragraph W or paragraph X describe, further comprising: generating one or more anchors at a point of the input image; determining an overlap of individual ones of the one or more anchors to a ground-truth box; assigning a label to each anchor of the one or more anchors based at least in part on the overlap; assigning a score to the label based at least in part on the overlap; and identifying the candidate object at the point based at least in part on the score.

Z: A computer-readable medium as any of paragraphs W-Y describe, wherein the RPN comprises a translation invariant component configured to: classify an anchor based on overlap with a ground-truth box; and predict a shift and a scale of the anchor.

AA: A computer-readable medium as any of paragraphs W-Z describe, further comprising training the convolutional feature map, the RPN, and the proposal classifier using one or more of: stochastic gradient descent; or back-propagation.

AB: A computer-readable medium as any of paragraphs W-AA describe, wherein the convolutional feature map is generated by a Zeiler and Fergus model or a Simonyan and Zisserman model deep convolutional neural network.

AC: A computer-readable medium as paragraph Y describes, wherein the generating the one or more anchors at the point of the input image comprises generating a set of anchor boxes, the set anchor boxes having three scales and three aspect ratios.

AD: A computer-readable medium as paragraph Y describes, further comprising: identifying an anchor of the one or more anchors corresponding to a highest score, the highest score corresponding to a percentage of the overlap; shifting the anchor corresponding to the highest score; and scaling the anchor corresponding to the highest score.

AE: A device or system comprising: a processor; and a computer-readable medium as any of paragraphs W-AD describes coupled to the processor.

AF: A device comprising: a processor; and a computer-readable medium in communication with the processor, the computer-readable medium including modules comprising: an initial processing module configured to input an image and generate a convolutional feature map; an object proposal module configured to generate, by a region proposal network (RPN), a proposal corresponding to a candidate object in the image; a proposal classifier module configured to assign, by a fast region based convolutional neural network (FRCN), a category associated with the candidate object.

AG: device as paragraph AF describes, wherein the proposal classifier module is further configured to assign a confidence score to the classification.

AH: A device as either paragraph AF or paragraph AG describes, wherein the RPN comprises a translation invariant component configured to: classify an anchor based on overlap with a ground-truth box; and predict a shift and a scale of the anchor.

AI: A device as any of paragraphs AF-AH describe, wherein the object proposal module is further configured to: generate one or more anchors at a point of the image; determine an overlap of each anchor of the one or more anchors to a ground-truth box; assign a label to each anchor of the one or more anchor based at least in part on the overlap; assign a score to the label based at least in part on the overlap; select an anchor with a highest score; and generate the proposal based at least in part on the highest score.

AJ: A device as any of paragraphs AF-AI describe, wherein the object proposal module is further configured to: identify an anchor corresponding to a highest score, the highest score corresponding to a percentage of the overlap; shift the anchor corresponding to the highest score to better define the candidate object; and scaling the anchor corresponding to the highest score to better define the candidate object.

AK: A device as any of paragraphs AF-AJ describe, further comprising a machine learning module configured to: train one or more parameters of the initial processing module and the object proposal module to generate one or more proposals on a training image; and train one or more parameters of the proposal classifier module to assign a category to each of the one or more proposals on the training image.

AL: A device as any of paragraphs AF-AK describe, wherein the machine learning module is further configured to train the one or more parameters of the initial processing module, the object proposal module, and the proposal classifier module using one or more of: stochastic gradient descent; or back-propagation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 106, 126, or 200 such as one or more internal or external CPUs or GPUs, and/or one or more pieces of hardware logic such as FPGAs, DSPs, or other types described above.

All of the methods and processes described above can be embodied in, and fully automated via, software code modules executed by one or more general purpose computers or processors. The code modules can be stored in any type of computer-readable storage medium or other computer storage device. Some or all of the methods can be embodied in specialized computer hardware.

Conditional language such as, among others, "can," "could," "might" or "may," unless specifically stated otherwise, are otherwise understood within the context as used in general to present that certain examples include, while other examples do not include, certain features, elements and/or steps. Thus, such conditional language is not generally intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate examples are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A method comprising:
   receiving an input image;
   generating a convolutional feature map;
   identifying, by a first type of neural network, a candidate object in the input image;
   determining, by a second type of neural network, a category of the candidate object; and
   assigning a confidence score to the category of the candidate object,
   wherein the first type of neural network comprises a translation invariant component configured to:
   classify an anchor based on overlap with a ground-truth box; and
   predict a shift and a scale of the anchor.

2. A method as claim 1 recites, wherein the convolutional feature map is generated by a Zeiler and Fergus model or a Simonyan and Zisserman model deep convolutional neural network.

3. A method as claim 1 recites, further comprising training the convolutional feature map, the first type of neural network, and the second type of neural network using at least one of:
   stochastic gradient descent; or
   back-propagation.

4. A method as comprising:
   receiving an input image;
   generating a convolutional feature map;
   identifying, by a first type of neural network, a candidate object in the input image, wherein the identifying the candidate object in the input image comprises:
   generating one or more anchors at a point of the input image;
   determining an overlap of individual ones of the one or more anchors to a ground-truth box;
   assigning a label to each anchor of the one or more anchors based at least in part on the overlap;
   assigning a score to the label based at least in part on the overlap; and
   identifying the candidate object at the point based at least in part on the score;
   determining, by a second type of neural network, a category of the candidate object, wherein the first type of neural network and the second type of neural network share at least one algorithm; and
   assigning a confidence score to the category of the candidate object.

5. A method as claim 4 recites, wherein the identifying the candidate object in the input image further comprises:
   identifying an anchor corresponding to a highest score, the highest score corresponding to a percentage of the overlap;
   shifting the anchor corresponding to the highest score to better define the candidate object; and
   scaling the anchor corresponding to the highest score to better define the candidate object.

6. A method as claim 4 recites, wherein the generating the one or more anchors at the point of the input image comprises generating a set of anchor boxes; the set anchor boxes having three scales and three aspect ratios.

7. A method as claim 4 recites, wherein the label is positive when the overlap exceeds a threshold level.

8. A system comprising:
a processor; and
a computer-readable medium including instructions for an object detection and classification network, for execution by the processor, the object detection and classification network comprising:
an initial processing module configured to input an image and generate a convolutional feature map;
an object proposal module configured to generate a proposal corresponding to a candidate object in the image, and further comprising a translation invariant component configured to:
classify an anchor based on overlap with a ground-truth box; and
predict a shift and a scale of the anchor; and
a proposal classifier module configured to assign a category associated with the candidate object, wherein the object proposal module and the proposal classifier module share at least one convolutional layer.

9. A system as claim 8 recites, wherein the proposal classifier module is further configured to assign a confidence score to the classification.

10. A system as claim 8 recites, wherein the object proposal module is further configured to:
generate one or more anchors at a point of the image;
determine an overlap of each anchor of the one or more anchors to a ground-truth box;
assign a label to each anchor of the one or more anchor based at least in part on the overlap;
assign a score to the label based at least in part on the overlap;
select an anchor with a highest score; and
generate the proposal based at least in part on the highest score.

11. A system comprising:
a processor; and
a computer-readable medium including instructions for an object detection and classification network, for execution by the processor, the object detection and classification network comprising:
an initial processing module configured to input an image and generate a convolutional feature map;
an object proposal module configured to generate a proposal corresponding to a candidate object in the image, wherein the object proposal module is further configured to:
identify an anchor corresponding to a highest score, the highest score corresponding to a percentage of the overlap;
shift the anchor corresponding to the highest score to better define the candidate object; or
scale the anchor corresponding to the highest score to better define the candidate object; and
a proposal classifier module configured to assign a category associated with the candidate object, wherein the object proposal module and the proposal classifier module share at least one convolutional layer.

12. A system comprising:
a processor;
a computer-readable medium including instructions for an object detection and classification network, for execution by the processor, the object detection and classification network comprising:
an initial processing module configured to input an image and generate a convolutional feature map;
an object proposal module configured to generate a proposal corresponding to a candidate object in the image; and
a proposal classifier module configured to assign a category associated with the candidate object, wherein the object proposal module and the proposal classifier module share at least one convolutional layer; and
a machine learning module configured to:
train one or more parameters of the initial processing module and the object proposal module to generate one or more proposals on a training image; and
train one or more parameters of the proposal classifier module to assign a category to each of the one or more proposals on the training image.

13. A system as claim 12 recites, wherein the machine learning module is further configured to train the one or more parameters of the initial processing module, the object proposal module, and the proposal classifier module using one or more of:
stochastic gradient descent; or
back-propagation.

14. A non-transitory computer readable storage medium having instructions stored thereon, the instructions when executed by a computing device cause the computing device to:
receive an input image;
generate a convolutional feature map;
generate one or more anchors at a point of the input image;
determine an overlap of individual ones of the one or more anchors to a ground-truth box;
assign a label to each anchor of the one or more anchors based at least in part on the overlap;
assign a score to the label based at least in part on the overlap;
identify, by a neural network, a candidate object in the input image, the candidate object at the point based at least in part on the score;
determine, by a proposal classifier sharing an algorithm with the neural network, a category of the candidate object; and
assign, by the proposal classifier, a confidence score to the category of the candidate object.

15. A non-transitory computer readable storage medium as claim 14 recites, wherein the neural network is a region proposal network and the proposal classifier is a component of a fast region based convolutional neural network.

16. A non-transitory computer readable storage medium as claim 14 recites, further comprising instructions to train the convolution feature map, the neural network, and the proposal classifier using at least one of:
stochastic gradient descent; or
back-propagation.

17. A non-transitory computer readable storage medium having instructions stored thereon, the instructions when executed on a computing device cause the computing device to:
receive an input image;
generate a convolutional feature map;
identify, by a neural network, a candidate object in the input image;
determine, by a proposal classifier sharing an algorithm with the neural network, a category of the candidate object; and assign, by the proposal classifier, a confidence score to the category of the candidate object, wherein the neural network comprises a translation invariant component configured to:
classify an anchor based on overlap with a ground-truth box; and
predict a shift and a scale of the anchor.

* * * * *